Patented July 22, 1941

2,249,956

UNITED STATES PATENT OFFICE 2,249,956

DOUBLE SALTS OF WATER-SOLUBLE DERIVATIVES OF INSOLUBLE AZO DYESTUFFS

Johannes Heyna, Frankfort-on-the-Main, Germany, assignor to General Aniline & Film Corporation, a corporation of Delaware No Drawing. Application June 14, 1939, Serial No. 279,044. In Germany June 16, 1938

5 Claims. (Cl. 260—146)

The present invention relates to double salts of water-soluble derivatives of azo-dyestuffs insoluble in water and to a process of preparing the same.

British Patent No. 480,358 discloses a process having for its object the conversion of water-insoluble dyestuffs containing at least one hydroxyl group into a water-soluble form. That process consists in subjecting the dyestuff in the presence of pyridine to the action of an acylating agent which in addition to the group having the acylating action contains at least one group which, if necessary after a suitable transformation, imparts solubility in water to the dyestuff derivative formed. As acylating agents of this kind there may be used, for instance, benzoic acid-meta-sulfochloride, meta-sulfobenzoic acid-dichloride, 4-chloromethyl-1-benzoyl chloride, 5-sulfosalicylic acid-dichloride and the like.

The water-soluble compounds formed which are in part pyridine salts, in part quaternary pyridinium compounds are always obtained in admixture with pyridine hydrochloride, unchanged parent material and undefinable by-products and they can be separated, especially from the pyridine hydrochloride, only with difficulty and incompletely. They are, moreover, in many cases only sparingly soluble in water.

Now, I have found that these water-soluble pyridine compounds can be obtained in a very pure state, free from pyridine hydrochloride, parent materials and by-products by separating them in the form of double salts from their filtered aqueous solutions. Especially suitable for the separation are the agents which are appropriate for separating diazo-compounds in the form of their double salts, for instance inorganic salts, such as zinc chloride, cadmium chloride and others, further inorganic and organic acids, such as hydrofluoboric acid, naphthalene-disulphonic acids and the like. The double salts separate from the aqueous solutions, immediately or on addition of sodium chloride, in a crystalline form. They may then be filtered with suction and dried. They are in part considerably better and more readily soluble in water than the initial pyridine compounds and, therefore, particularly suitable for the manufacture of printing pastes.

The new double salts may, for instance, be characterized by the following general formula:

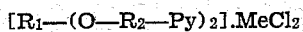

wherein $R_1$ stands for the radical of a water-insoluble azo-dyestuff of the 2.3-hydroxynaphthoic acid arylide series, $R_2$ represents the radical of an organic acid containing at least one group capable of forming a water-soluble pyridine compound, Py means a pyridine radical, and Me stands for Zn, Cd, Co or Mn.

The following examples serve to illustrate the invention but they are not intended to limit it thereto; the parts are by weight:

1. The condensation product made from 23 parts of the azo-dyestuff from diazotized 1-amino-2-methoxy-5-chlorobenzene and 1-(2'.3'-hydroxynaphthoylamino)-2-methoxybenzene and 30 parts of 4-chloromethyl-1-benzoylchloride in 100 parts of pyridine is, after distillation of the pyridine, dissolved in water; the solution is filtered and a dilute solution of zinc chloride is added, while stirring, until on addition of caustic soda solution to the filtrate of a test portion, no dyestuff is precipitated. The product is filtered with suction and dried under reduced pressure. The zinc chloride double salt is very readily soluble in water.

2. The condensation product made from 20 parts of the azo-dyestuff from diazotized 1-amino-2.5-dichlorobenzene and 1-(2'.3'-hydroxynaphthoylamino)-2-methoxybenzene and 30 parts of 4-chloromethyl-1-benxoylchloride in 100 parts of pyridine is, after distillation of the pyridine, dissolved in water; by filtration, the solution is freed from some dyestuff, and a dilute zinc chloride solution is added, while stirring, until no dyestuff is any longer precipitated on heating the filtrate of a test portion with caustic soda solution. The product is filtered with suction and dried under reduced pressure. The zinc chloride double salt is very readily soluble in water.

3. The condensation product made from 23 parts of the azo-dyestuff from diazotized 1-amino-2-methoxy-5-chlorobenzene and 1-(2'.3'-hydroxynaphthoylamino)-2-methoxybenzene and 36 parts of the dichloride of meta-sulfobenzoic acid in 100 parts of pyridine is, after distillation of the pyridine, dissolved in water; the solution is filtered, and a solution containing 6.5 parts of zinc chloride is added, while stirring. The zinc chloride double salt is salted out by means of sodium chloride, stirred for some time, filtered with suction and dried under reduced pressure. It very readily dissolves in water.

4. The condensation product obtained from 20 parts of the azo-dyestuff from diazotized 1-amino-2.5-dichlorobenzene and 1-2'.3'-hydroxynaphthoylamino)-2-methoxybenzene and 36 parts of the dichloride of meta-sulfobenzoic acid in 100 parts of pyridine is worked up as indicated in Example 3. The zinc chloride double salt is very easily soluble in water.

5. The condensation product obtained as indicated in Example 1 is dissolved in water and filtered; an aqueous solution of cadmium chloride is then added, while stirring, until no dyestuff is any longer precipitated on addition of caustic soda solution to the filtrate of a test portion. The cadmium chloride double salt is filtered with suction and dried. It is easily soluble in water.

6. The condensation product made from 21 parts of the azo-dyestuff from diazotized 1-amino-3-chlorobenzene and 1-(2'.3'hydroxy-naphthoylamino)-2-methylbenzene and 36 parts of the dichloride of meta-sulfo-benzoic acid in 100 parts of pyridine is, after distillation of the pyridine, dissolved in water; the solution is then filtered and a dilute zinc chloride solution is added, drop by drop, while stirring, until no dyestuff is any longer precipitated on addition of caustic soda solution to the filtrate of a test portion. Stirring is continued for some time, the product is filtered with suction and dried under reduced pressure. The zinc chloride double salt is very readily soluble in water.

7. The condensation product obtained as indicated in Example 1 is, after distillation of the pyridine, dissolved in water; the solution is filtered and an aqueous solution containing 12 parts of cobaltous chloride is added, while stirring. The double salt is salted out by means of sodium chloride, filtered with suction and dried. It very easily dissolves in water.

Instead of 12 parts of cobaltous chloride there may also be used 10 parts of manganous chloride. The manganous chloride double salt is likewise easily soluble in water.

8. The condensation product made as indicated in Example 1 is mixed, while stirring, with an aqueous solution of hydrofluoboric acid, until the hydrofluoboric acid double salt has separated in a crystalline form. It is filtered with suction and dried. It is easily soluble in water.

If there is used, instead of hydrofluoboric acid, an aqueous solution of 1.5-naphthalene-disulfonic acid, the 1.5-naphthalene-disulfonic acid double salt is separated.

9. The condensation product made as indicated in Example 6 is, after distillation of the pyridine, dissolved in water; the solution is filtered and an excess of hydrofluoboric acid is added, while stirring. The hydrofluoboric acid double salt is filtered with suction and dried. It is very easily soluble in water.

10. The condensation product made from 30 parts of the azo-dyestuff from diazotized 1-amino-2.5-dimethoxy-4-benzoylaminobenzene and 2.3-hydroxynaphthoyl-aminobenzene and 35 parts of 4-chloromethyl-1-benzoyl chloride in 100 parts of pyridine is, after distillation of the pyridine, dissolved in water; the solution is filtered and a dilute zinc chloride solution containing 3.5 parts of zinc chloride is added, while stirring. The double salt is salted out by means of sodium chloride. After filtering with suction, the zinc chloride double salt has a very good solubility in water.

The invention is not limited to the aforementioned examples; it is also possible to transform into corresponding double salts all pyridine compounds of the various azo-dyestuffs obtainable by the process of British Patent No. 480,358 with application of the various acylating agents.

I claim:

1. A process of preparing double salts of water-soluble derivatives of azo dyestuffs insoluble in water which comprises subjecting water-insoluble azo dyestuffs of the 2.3 hydroxynaphthoic acid arylide series in the presence of pyridine to the action of an acylating agent which, in addition to the group having the acylating action, contains at least one group which imparts solubility in water to the dyestuff derivative formed and separating the water-soluble pyridine compounds thus obtained in the form of double salts by addition of mineral acid salts selected from the group consisting of Zn, Cd, Co and Mn to their aqueous solutions.

2. The double salts of water-soluble derivatives of azo-dyestuffs insoluble in water corresponding with the following general formula:

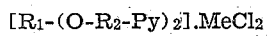

wherein $R_1$ stands for the radical of a water-insoluble azo-dyestuff of the 2.3-hydroxynaphthoic acid arylide series, $R_2$ represents the radical of an organic acid containing at least one group capable of forming a water-soluble pyridine compound, Py means a pyridine radical, and Me stands for a member of the group consisting of Zn, Cd, Co and Mn, being uncolored crystallized substances which are very readily soluble in water.

3. The zinc chloride double salt of a water-soluble derivative of an azo-dyestuff corresponding with the following general formula:

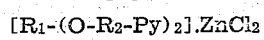

wherein $R_1$ stands for the radical of the azo-dyestuff from diazotized 1-amino-2-methoxy-5-chlorobenzene and 1-(2'.3'-hydroxynaphthoylamino)-2-methoxybenzene, $R_2$ represents a benzoyl radical containing a chloromethyl group in para-position to the benzoyl-group, and Py means a pyridine radical, being an uncolored crystallized substance which is very readily soluble in water.

4. The zinc chloride double salt of a water-soluble derivative of an azo-dyestuff corresponding with the following general formula:

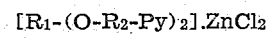

wherein $R_1$ stands for the radical of the azo-dyestuff from diazotized 1-amino-2.5-dichloro-benzene and 1-(2'.3'-hydroxynaphthoylamino)-2-methoxybenzene, $R_2$ represents a benzoyl radical containing a sulfo-group in meta-position to the benzoyl-group, Py means a pyridine radical, being an uncolored crystallized substance which is very readily soluble in water.

5. The zinc chloride double salt of a water-soluble derivative of an azo-dyestuff corresponding with the following general formula:

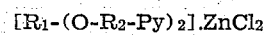

wherein $R_1$ stands for the radical of the azo-dyestuff from diazotized 1-amino-3-chlorobenzene and 1-(2'.3'-hydroxynaphthoylamino)-2-methylbenzene, $R_2$ represents a benzoyl radical containing a sulfo-group in meta-position to the benzoyl-group, and Py means a pyridine radical, being an uncolored crystallized substance which is very readily soluble in water.

JOHANNES HEYNA.